(12) United States Patent
Arai

(10) Patent No.: US 6,282,892 B1
(45) Date of Patent: Sep. 4, 2001

(54) PUMP CONTROLLER FOR CONSTRUCTION MACHINE

(75) Inventor: Seigo Arai, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 09/294,030

(22) Filed: Apr. 20, 1999

(30) Foreign Application Priority Data

Apr. 23, 1998 (JP) .................................................. 10-113631

(51) Int. Cl.$^7$ ..................................................... F16D 31/02
(52) U.S. Cl. .................................................. 60/450; 60/452
(58) Field of Search ............................. 60/445, 450, 452

(56) References Cited

U.S. PATENT DOCUMENTS

| | | | |
|---|---|---|---|
| 4,546,847 | * | 10/1985 | Abels .................................. 60/450 X |
| 5,077,972 | * | 1/1992 | Bianchetta et al. ................. 60/450 X |
| 5,758,499 | * | 6/1998 | Sugiyama et al. ...................... 60/450 |

\* cited by examiner

*Primary Examiner*—Hoang Nguyen
(74) *Attorney, Agent, or Firm*—Oblon, Spivak, McClelland, Maier & Neustadt, P.C.

(57) ABSTRACT

The invention provides a pump controller for a construction machine that allows an operator to set the maximum speed of a specific actuator arbitrarily without altering the negative control and acquire a smooth operation. The pump controller comprises a plurality of control valves to supply actuators with a controlled pressure oil, a variable displacement hydraulic pump to supply the plural control valves with the pressure oil in parallel, a center bypass connected in parallel to the control valves, and a restrictor to generate a control pressure for negatively controlling the variable displacement hydraulic pump installed at a terminal end of the center bypass. The pump controller further comprises pressure sensors to recognize the operation of the actuator, a controller that sets a pump discharge characteristic individually to the control valve for the actuator in accordance with the operation state of the actuator, calculates a pump discharge corresponding to the control pressure using the set pump discharge characteristic, and controls the angle of inclination of a regulator.

5 Claims, 10 Drawing Sheets

PUMP CONTROLLER FOR CONSTRUCTION MACHINE

BACKGROUND OF THE INVENTION

1 Field of the Invention

The present invention relates to a pump controller for a construction machine equipped with a hydraulic circuit to execute a negative control.

2 Description of the Related Art

FIG. 10 illustrates a general negative control circuit in a hydraulic excavator. In the negative control circuit shown in the drawing, the discharge port of a variable displacement hydraulic pump 30 is connected to a tank 34 by a center bypass 31 through a plurality of control valves, for example, a swing motor control valve 32 and an arm control valve 33. Each of the control valves 32, 33 is supplied in parallel with a pressure oil discharged from the variable displacement hydraulic pump 30 in the operation mode.

A negative control restrictor 35 is installed on the downstream of the arm control valve 33 in the center bypass 31. An upstream point a to the negative control restrictor 35 is connected by a hydraulic signal line b to a regulator 36 that varies a discharge from the hydraulic pump 30. Thereby, the negative control is designed such that when the pressure of the hydraulic signal line b becomes low, the discharge from the hydraulic pump 30 is increased, and when the pressure of the hydraulic signal line b becomes high, the discharge is decreased. Here in the drawing, the symbol 37 and 38 signify a swing motor and an arm cylinder, as actuators, each supplied with a pressure oil in which the flow rate and direction are controlled.

In the circuit, the discharge from the variable displacement hydraulic pump 30 is determined by the magnitudes of the loads to the actuators and the sizes of the bleeding-off control restrictors of the control valves 32, 33. However, since the magnitudes of the loads vary from moment to moment, the discharge in the hydraulic circuit is set appropriately although the minimum and maximum discharges are grasped.

However, in a work with a hydraulic excavator, there is such a situation that the maximum speed in the swing mode is desirably suppressed, and the speed of the arm is desirably not to be lowered.

As the measures for this case, as shown in the opening area characteristic (in FIG. 11) of the control valves 32, 33, the maximum speed of a specific actuator can be lowered by making the opening area characteristic of the bleeding-off control restrictor without a closure. However, when the pressure on the load is high, since the flow rate passing through the bleeding-off control restrictor of the control valve increases, the flow rate passing through the negative control restrictor 35 increases, as shown in FIG. 12. As a result, the effect by the negative control extremely lowers the pump discharge, creates a state in which the operation lever has to be manipulated deeper than needed for activating the actuator, or makes the pump discharge insufficient so that the maximum pressure cannot be generated, which is a shortcoming.

And, as shown in FIG. 13, the negative control characteristic is forcibly made into a head suppression, and conceivably the maximum pump discharge is varied for each actuator. However in this case, when an operator manipulates the operation lever of the swing motor 37 in full to switch the swing motor control valve 32 from a position c to a position d (see FIG. 10), since the center bypass 31 is blocked by the swing motor control valve 32, the pressure oil passing through the negative control restrictor 35 runs short, and the pressure of the signal line b becomes low, whereby the discharge from the variable displacement hydraulic pump 30 is increased. Therefore, when the operator manipulates the arm operation lever still further, the pump discharge flow rate increases at a stroke. On the contrary, when returning to a single operation, the pump flow rate rapidly decreases. Thus, since the discharge fluctuates greatly at each time when the actuator is switched from the single operation into the compound operation, or on the contrary, when switched from the compound operation into the single operation, the operator gets into a state of difficulty with operation.

Further, in case a plurality of pumps are controlled independently, the pump maximum discharge is needed to be varied as to a confluent flow. Furthermore, in case a heavyweight optional equipment is mounted on in replacement of a normal front attachment, the pump maximum discharge is needed to be varied in correspondence with the optional equipment.

SUMMARY OF THE INVENTION

The invention has been made in view of the foregoing problems in the conventional hydraulic circuit, and an object of the invention is to provide a pump controller for a construction machine that allows an operator to set the maximum speed of a specific actuator arbitrarily without altering the negative control and acquire a smooth operation.

In order to accomplish the object, the first invention of a pump controller for a construction machine is disclosed. The construction machine has a variable displacement hydraulic pump, a plurality of control valves connected in series to a center bypass attached to the variable displacement hydraulic pump and a plurality of actuators to receive and drive a pressure oil whose flow rate and direction are controlled by the control valves. The controller comprises means for generating a control pressure for negatively controlling a discharge from the variable displacement hydraulic pump, which is installed at a terminal part of a center bypass line extending from a discharge port of the variable displacement hydraulic pump, passing through the center bypass, recognition means for recognizing an operation of each actuator, a sensor that converts the control pressure into an electric signal and outputs the converted signal, pump characteristic setting means for storing a pump discharge characteristic for each actuator, selecting the pump discharge characteristic corresponding to the actuator whose operation is recognized by the recognition means and setting the selected pump discharge characteristic, pump discharge operation means for calculating a pump discharge in accordance with a pressure control signal outputted from the sensor, using the set pump discharge characteristic, and variable discharge means for converting the calculated pump discharge into a pump control signal and outputting the converted pump control signal to the variable displacement hydraulic pump.

The recognition means in this invention can be made up with a pressure sensor that detects a remote control pressure introduced at a pilot port of the control valve. Preferably, the recognition means detects the manipulated variable and direction of each actuator for each of them.

The pump characteristic setting means in this invention preferably sets a basic pump discharge characteristic, with regard to an actuator whose maximum speed is desirably suppressed, and preferably sets an extra increment pump discharge characteristic made by continuously increasing the maximum discharge point from a specific point on the basic pump discharge characteristic, with regard to an actuator whose maximum speed is desirably secured.

The second invention of a pump controller for a construction machine is disclosed. The construction machine has a plurality of variable displacement hydraulic pumps, a plurality of control valves connected in series to a center bypass attached to each of the variable displacement hydraulic pumps and a plurality of actuators to receive and drive a pressure oil whose flow rate and direction are controlled by the control valves. The controller comprises means for generating a control pressure for negatively controlling a discharge from each of the variable displacement hydraulic pumps, which is installed at a terminal part of a center bypass line extending from a discharge port of each of the variable displacement hydraulic pumps, passing through the center bypass, in which, as to a specific actuator, pressure oils discharged from a plurality of the variable displacement hydraulic pumps are combined through a confluent valve, a sensor that converts the control pressure into an electric signal and outputs the converted electric signal, pump characteristic setting means for setting a basic pump discharge characteristic, when the specific actuator does not receive a confluent flow, and setting an extra increment pump discharge characteristic made by continuously increasing a maximum discharge point from a specific point on the basic pump discharge characteristic, when the specific actuator receives the confluent flow, pump discharge calculation means for calculating a pump discharge in accordance with a pressure control signal outputted from the sensor, using the set pump discharge characteristic, and variable discharge means for converting the calculated pump discharge into a pump control signal and outputs the converted pump control signal to the variable displacement hydraulic pump.

The third invention of a pump controller for a construction machine is disclosed. The construction machine has a variable displacement hydraulic pump, a plurality of control valves connected in series to a center bypass attached to the variable displacement hydraulic pump and an actuator to receive and drive a pressure oil whose flow rate and direction are controlled by the control valves. The controller comprises means for generating a control pressure for negatively controlling a discharge from the variable displacement hydraulic pump, which is installed at a terminal part of a center bypass line extending from a discharge port of the variable displacement hydraulic pump, passing through the center bypass, a sensor that converts the control pressure into an electric signal and outputs the converted electric signal, second recognition means for recognizing that a load mounted on the actuator is replaced by a different load, pump characteristic setting means for setting a pump discharge characteristic made by continuously increasing or decreasing a maximum discharge from a specific point on a normal pump discharge characteristic to the actuator with the different load mounted thereon, when the load is replaced by the different load, pump discharge calculation means for calculating a pump discharge in accordance with a pressure control signal outputted from the sensor, using the set pump discharge characteristic, and variable discharge means for converting the calculated pump discharge into a pump control signal and outputting the converted pump control signal to the variable displacement hydraulic pump.

DETAILED DESCRIPTION OF THE EMBODIMENTS

Figure 1:
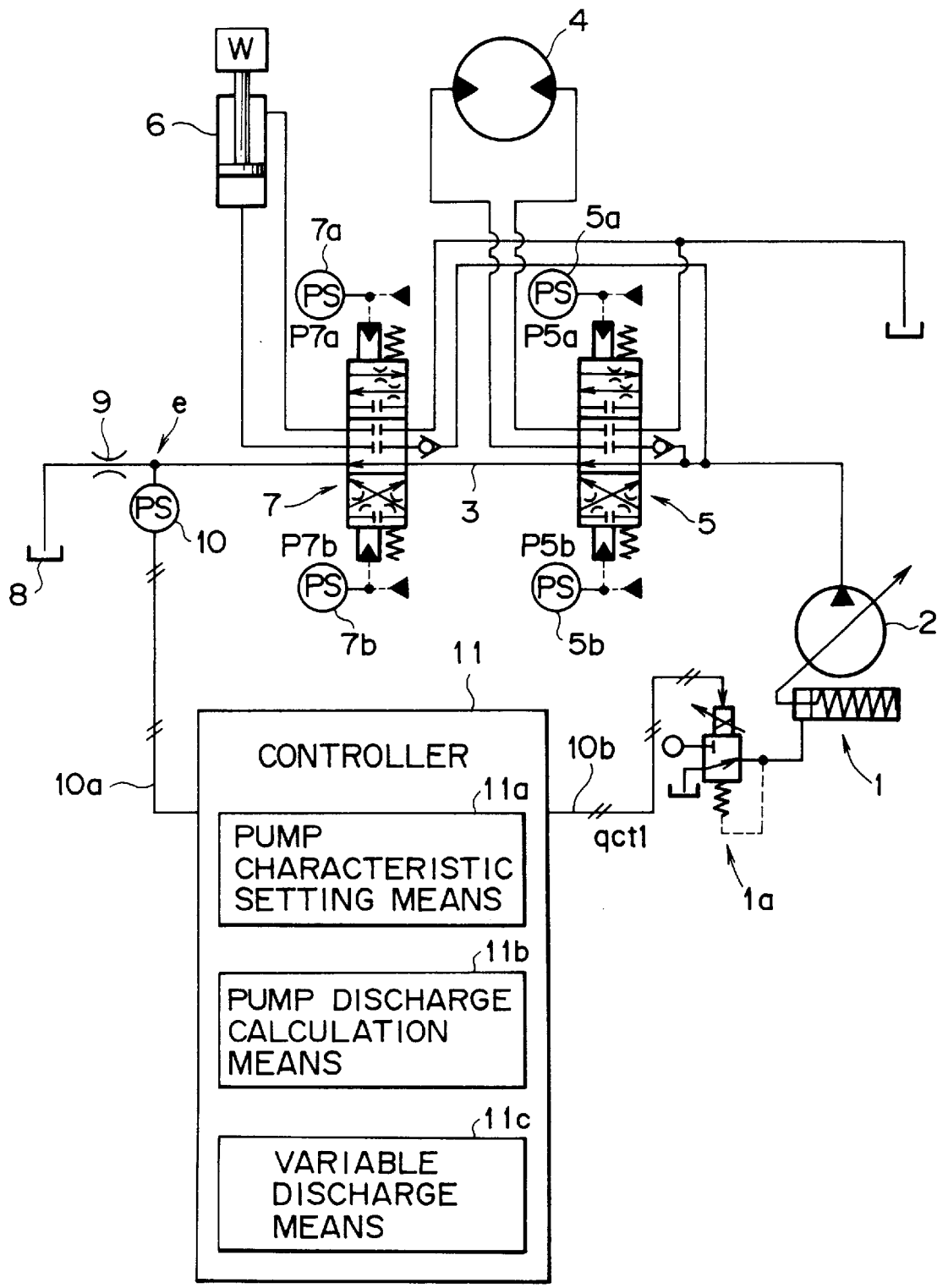
FIG. 1 is a hydraulic circuit to execute a pump control relating to the first invention.

The invention will now be described in detail according to the embodiment illustrated in the drawing.

FIG. 1 illustrates a construction of a pump controller relating to the first invention. In the drawing, the discharge port of a variable displacement hydraulic pump (hereunder, abbreviated as a hydraulic pump) 2 whose flow rate is designed to be varied by a regulator 1 is connected by a center bypass 3 to a tank 8 through a control valve 5 that drives a swing motor (actuator) 4 and a control valve 7 that drives an arm cylinder (actuator) 6. A pressure oil is supplied to each of the control valves 5, 7 in parallel from the hydraulic pump 2, whereby a confluent control can be achieved.

A negative control restrictor (means to generate a control pressure for executing the negative control) 9 is installed on the downstream of the control valve 7 in the center bypass 3. A pressure sensor 10 is installed at a point e on the upstream of the negative control restrictor 9 in the center bypass 3. A pressure detected by this pressure sensor 10 is converted into an electric signal Pneg, which is supplied through a signal line 10a to a controller (variable discharge means) 11 made up with a CPU.

Pressure sensors 5a and 5b (recognition means) are installed on pilot lines connected to each of pilot ports of the control valve 5, which can detect remote control pressures generated from a remote control valve (not illustrated) directly connected to an operation lever. The remote control pressures detected by the pressure sensors 5a and 5b are converted into electric signals P5a and P5b, which are supplied to the controller 11.

And, pressure sensors 7a and 7b are installed on pilot lines connected to each of pilot ports of the control valve 7, which can detect remote control pressures. The remote control pressures detected by the pressure sensors 7a and 7b are converted into electric signals P7a and P7b, which are supplied to the controller 11. The pressure sensors 5a, 5b and 7a, 7b each are to detect the manipulated variables and directions, respectively, of the control valves 5 and 7.

The controller 11 regularly monitors the electric signals outputted from the foregoing sensors, and carries out the processes in correspondence with each of the electric signals. Concretely, the controller 11 stores the pump discharge characteristic of each actuator in the ROM. A pump characteristic setting means 11a selects a pump discharge characteristic in correspondence with the actuator whose operation is recognized by the pressure sensor, and sets the selected pump discharge characteristic. A pump discharge calculation means 11b calculates a pump discharge in accordance with a pressure control signal outputted from the pressure sensor, using the pump discharge characteristic thus set. A variable discharge means 11c converts the calculated pump discharge into a pump control signal qctl, which is supplied to an electromagnetic proportional pressure-reducing valve 1a through a signal line 10b. Thereby, a hydraulic control signal is generated, and the angle of inclination of the regulator 1 is controlled by the hydraulic control signal.

In the conventional system, the hydraulic signal line connects the upstream point of the negative control restrictor 35 on the center bypass to the regulator 36 that varies the discharge of the variable displacement hydraulic pump, which introduces the upstream pressure of the negative control restrictor directly into the valve inlet port of the valve-type regulator as a hydraulic signal. However, in this invention, the hydraulic signal line is disconnected, and the upstream pressure of the negative control restrictor is converted into an electric signal, which is taken in by the controller 11, whereby the hydraulic pump 2 is able to set a discharge arbitrarily from a minimum to a maximum in accordance with a pump discharge command value electrically set by the controller 11.

The method to vary a discharge in the hydraulic circuit with the above construction will now be described.

Figure 2:
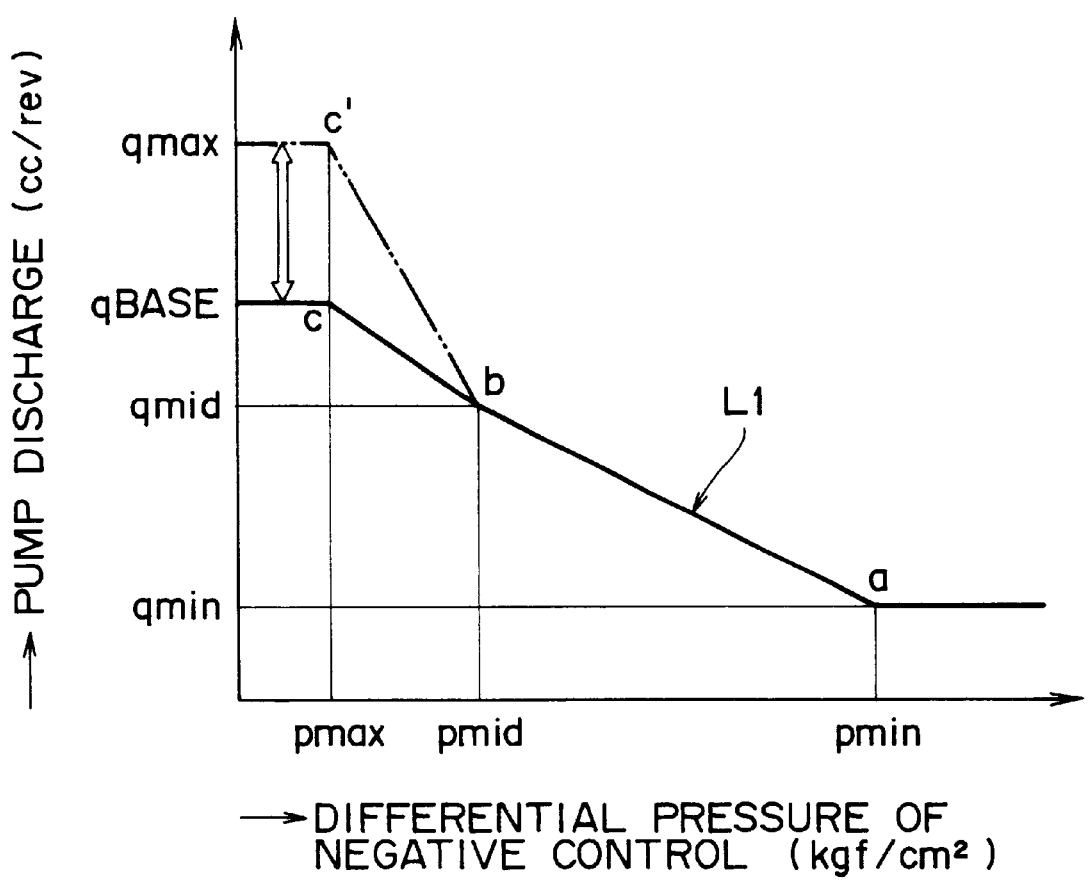
FIG. 2 is a graph to illustrate a variable negative control characteristic.

FIG. 2 illustrates a relation of the discharge of the hydraulic pump 2 with a differential pressure of the negative control. That is, when a pressure oil discharged from the hydraulic pump 2 flows through the center bypass 3 into the tank 8 in a state that the spools of the control valves 5, 7 are in neutral positions, namely, when the differential pressure of the negative control between the inlet of the negative control restrictor 9 and the outlet thereof is more than p min, the pump discharge at this moment is set to be minimum. Here, the pump discharge is expressed by the displacement (cc/rev).

On the other hand, when the spool of the control valve is moved to decrease the flow into the tank 8 through the center bypass 3, when the differential pressure of the negative control is brought to pmax, the maximum flow point of the pump is set to "c" point corresponding to the basic setting qBASE, or "c'" point corresponding the maximum setting q max where the discharge is set higher than the basic setting. In this manner, the feature of this invention lies in that the maximum flow point can be altered in correspondence with each actuator.

Concretely, the pump control characteristic corresponding to the actuator whose maximum speed is most desirably suppressed of the actuators attached to one and the same hydraulic pump 2 is set to the basic characteristic Li illustrated by the solid line in FIG. 2. Here, the "b" point (specific point on the basic discharge characteristic) next to the maximum flow point is set to an appropriate point on the solid line L1 based on the performance adjustment of an actual machine.

When the basic characteristic L1 illustrated in FIG. 2 is assigned to, for example, the pump control characteristic corresponding to the requirements for both operational directions in the swing motor 4, the discharge can be removed from the control object to be varied with regard to the swing motor 4. Therefore in this case, the controlled object whose discharge is varied is the other actuator, namely, the arm cylinder 6. Accordingly, the pump control characteristic is set so that the arm cylinder 6 can be operated with a maximum discharge qM in the arm push direction as shown in FIG. 3, and with a maximum discharge qN in the arm pull direction as shown in FIG. 4.

Figure 3:
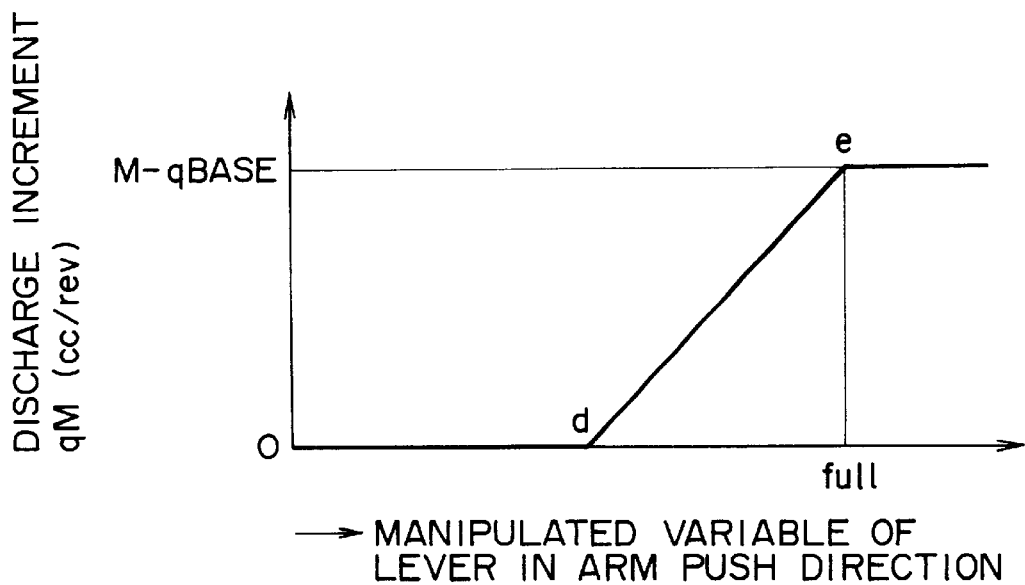
FIG. 3 is a graph to illustrate a discharge increment control during an arm push operation.
Figure 4:
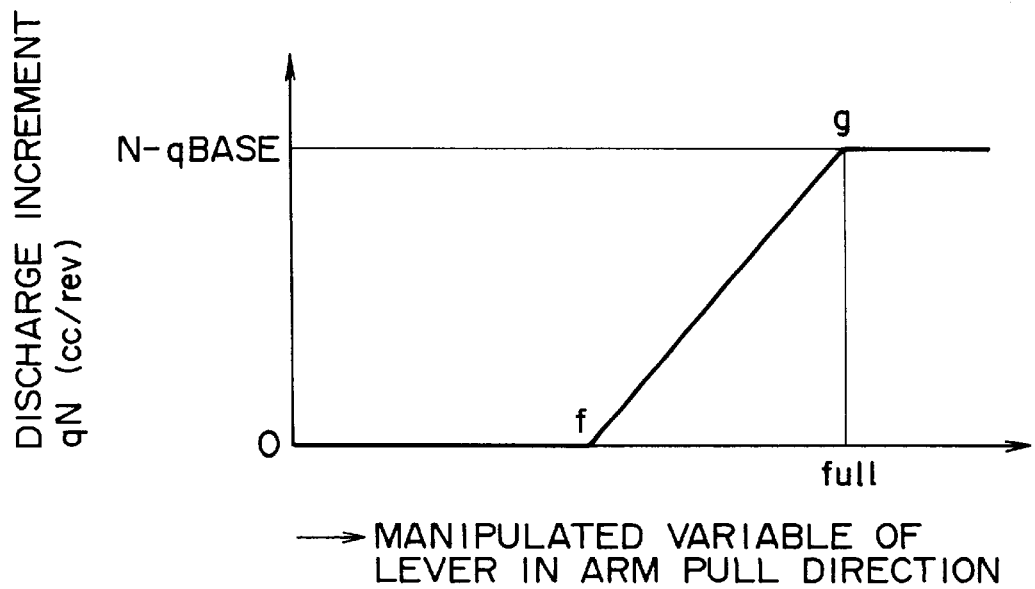
FIG. 4 is a graph to illustrate a discharge increment control during the arm pull operation.

The characteristic curves shown in FIG. 3 and FIG. 4 can be set to as many patterns as desired for each of the actuators, or for each of the operational directions. And, "M−qBASE" indicates that the difference between the maximum discharge qmax and the qBASE on the basic characteristic L1 is a variable range. Therefore, the discharge increment can be set arbitrarily within this range. For example, the discharge increment qM in regard to the arm push can be set low, and the discharge increment qN in regard to the arm pull can be set high. In FIG. 3 and FIG. 4, the discharge increment qM or qN is increased from virtually the center of the manipulated variable (symbol d→e, symbol f→g in the drawings), which intends to prevent the pump control operation from becoming unstable when the pump control is executed immediately in a state that the manipulated variable is small.

And, even when many actuators are accompanied with the hydraulic pump 2 to be controlled other than the swig motor 4 and the arm cylinder 6, if only the foregoing curve of the control characteristic is set, it becomes possible to vary the maximum discharge for each actuator.

Figure 5:
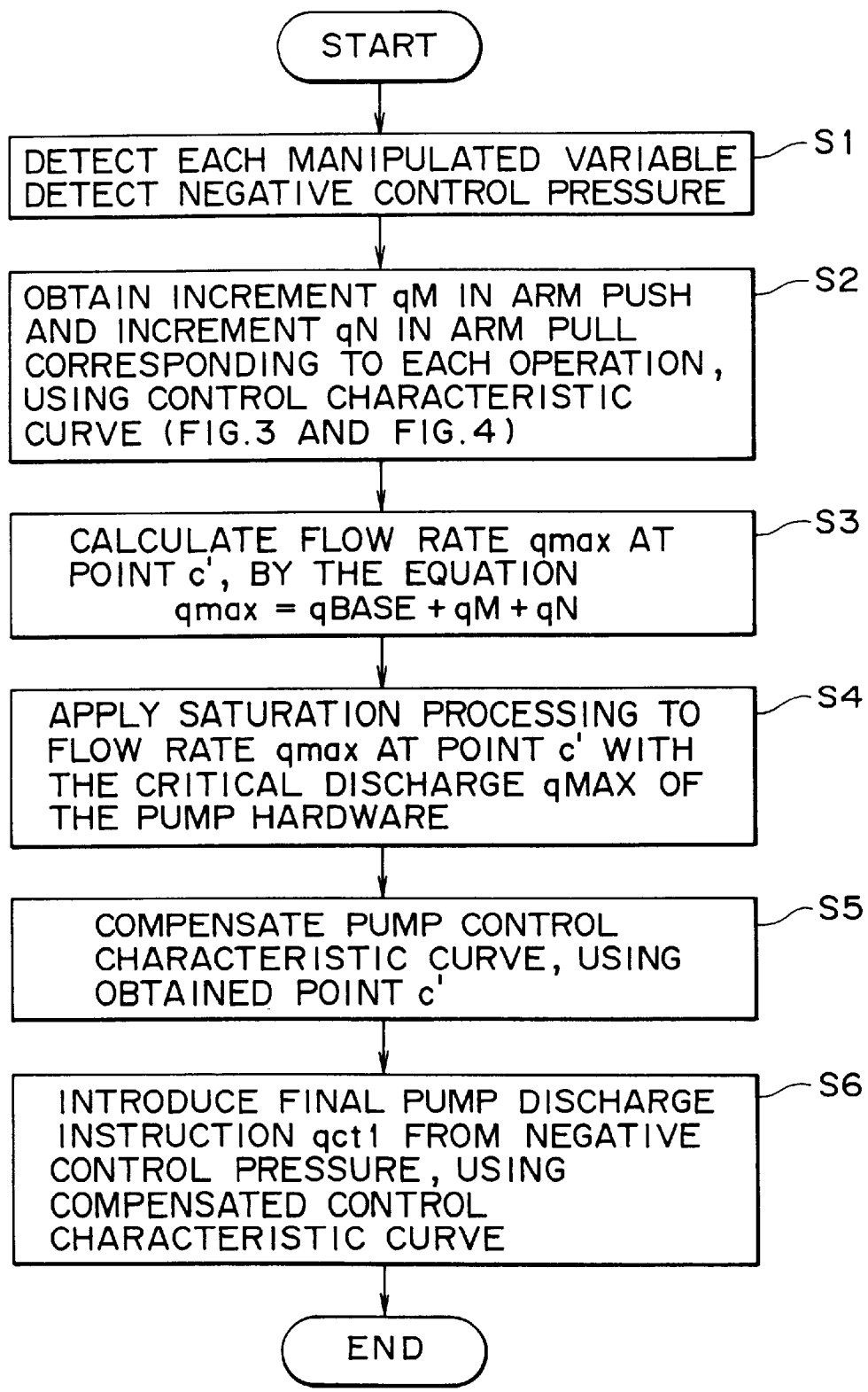
FIG. 5 is a flow chart to illustrate a control operation of a controller 11.

Next, the control operation of the controller 11 will be described according to the flow chart as shown in FIG. 5.

First, the controller 11 detects the manipulated variable of each lever and the operational direction thereof on the basis of the pressure signal outputted from each of the pressure sensors 5a, 5b and 7a, 7b. And at the same time, the controller 11 detects the differential pressure of the negative control on the basis of the pressure signal outputted from the pressure sensor 10 (step S1).

Next, according to the control characteristic curves corresponding to the operations (FIG. 3 in case of the arm push operation, and FIG. 4 in case of the arm pull operation), the increment qM (cc/rev) in case of the arm push operation and the increment qN (cc/rev) in case of the arm pull operation are obtained (step S2) in correspondence with each operation state.

Next, the flow rate qmax at the point c' (see FIG. 2) is calculated by the following equation (step S3).

$$qmax = qBASE + qM + qN \qquad \text{(step S4)}.$$

Using the flow rate qmax at the point c' calculated, the characteristic curve of the pump discharge control is compensated. In this compensation, a curve continuously connecting the point c' and the point b, for example, a straight line connecting the point c' and the point b is set as a curve corresponding to the negative control pressure between pmax and pmid (step S5).

Using the compensated characteristic curve of the pump discharge control, the final pump discharge instruction qctl is introduced on the basis of the differential pressure of the negative control, and after the saturation processing is applied thereto with the critical discharge qmax of the pump hardware, the pump discharge instruction qctl is outputted to the electromagnetic proportional pressure-reducing valve 1a (step SG). Thereby, the maximum speed of a specific actuator can be set arbitrarily.

Here, the control characteristic curve corresponding to each operation and the control characteristic curve of the pump discharge may be stored in terms of functional forms, or in terms of data maps.

Next, the 2-pump system will be described, in which the pressure oil is supplied to the actuators through a first and second variable displacement hydraulic pumps.

Figure 6:
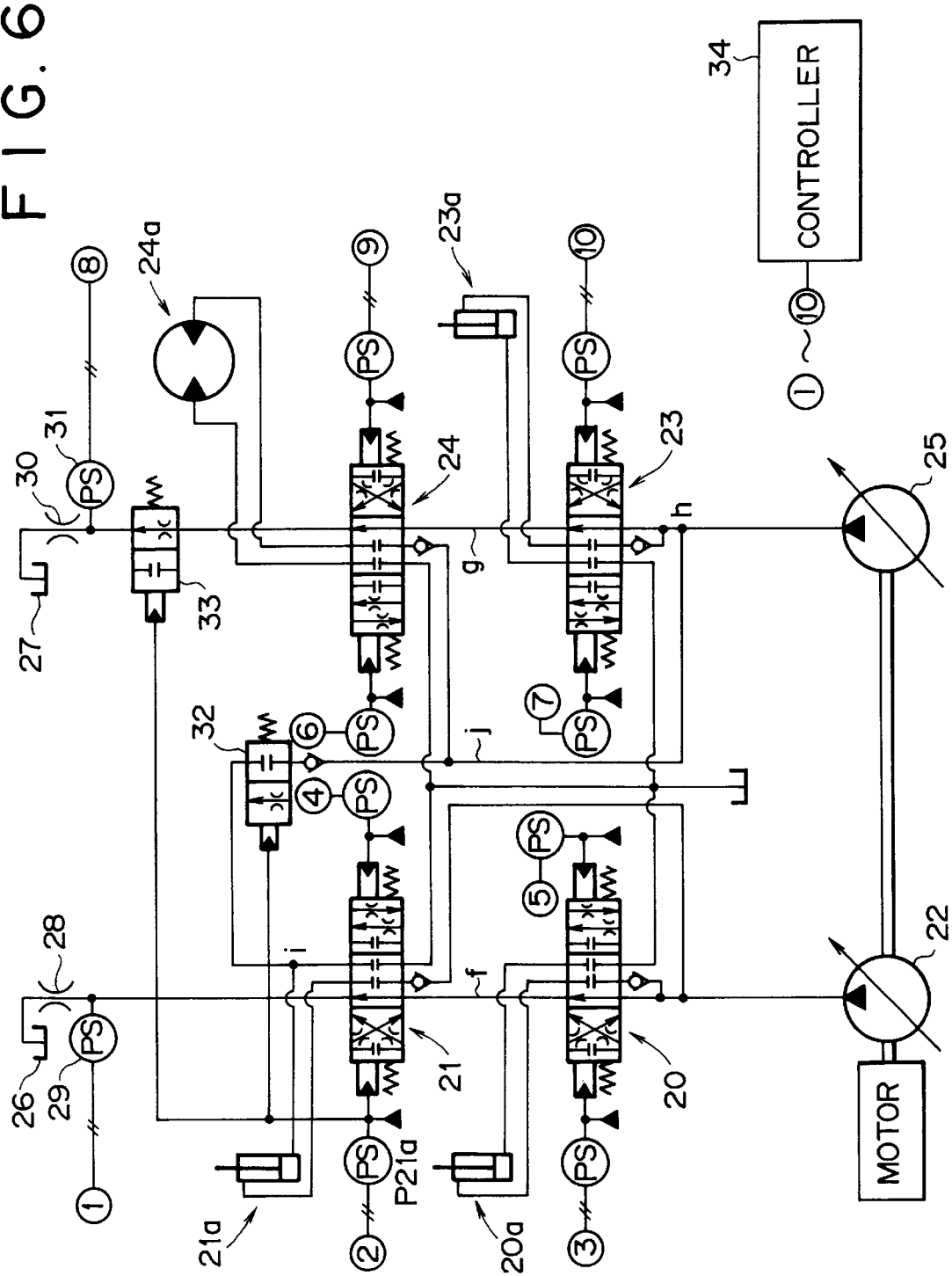
FIG. 6 is a hydraulic circuit to execute a pump control relating to the second invention.

In FIG. 6, the pressure oil supply lines of the control valves 20, 21 are connected in parallel to the first variable displacement hydraulic pump (hereunder, abbreviated as the first hydraulic pump) 22. On the other hand, the pressure oil supply lines of the control valves 23, 24 are connected in parallel to the second variable displacement hydraulic pump (hereunder, abbreviated as the second hydraulic pump) 25.

A discharge port of the first hydraulic pump 22 is connected to a tank 26 by a center bypass f through the control valves 20, 21; and a discharge port of the second hydraulic pump 25 is connected to a tank 27 by a center bypass g through the control valves 23, 24.

A negative control restrictor 28 is installed on the downstream of the control valve 21 in the center bypass f. A pressure sensor 29 is installed at a point between the control valve 21 and the negative control restrictor 28. In the same manner, the center bypass g is provided with a negative control restrictor 30 and a pressure sensor 31.

A point h on the upstream of the control valve 23 in the center bypass g is connected to a point i on a flow passage that supplies a pressure oil to the head side of the actuator 21a through a flow passage j, and a confluent valve 32 is installed on this flow passage j.

A bypass cut-off valve 33 to perform a confluent control is installed between the control valve 24 and the negative control restrictor 30 in the center bypass g.

Here, 20a, 21a, 23a, 24a denote actuators driven by the control valves 20, 21, 23, 24, respectively.

In the hydraulic circuit with the above construction, the actuator 21a employs the first hydraulic pump 22 as a main hydraulic power source, and receives the supply of a pressure oil from the second hydraulic pump 25 through the flow passage j and the confluent valve 32. Thereby, a confluent circuit is formed.

The pump control in this case is how to calculate a discharge of the second hydraulic pump 25 including a pressure oil confluence to this actuator 21a.

A pressure signal Pneg1 detected by the pressure sensor 29 and a pressure signal Pneg2 detected by the pressure sensor 31 each are supplied to a controller (variable discharge means) 34. The manipulated valuables of the actuators each are detected by pressure sensors (operational state detection means) that each detect pilot pressures of the control valves, which are supplied to controller 34 in the same manner.

Thus, in the foregoing construction, the controller 34 sets a discharge increment qG (described later) of the requirements for the confluence to the actuator 21a, in the same method as the setting of the required discharge increments qM, qN, as explained in FIG. 3 and FIG. 4.

Figure 7:
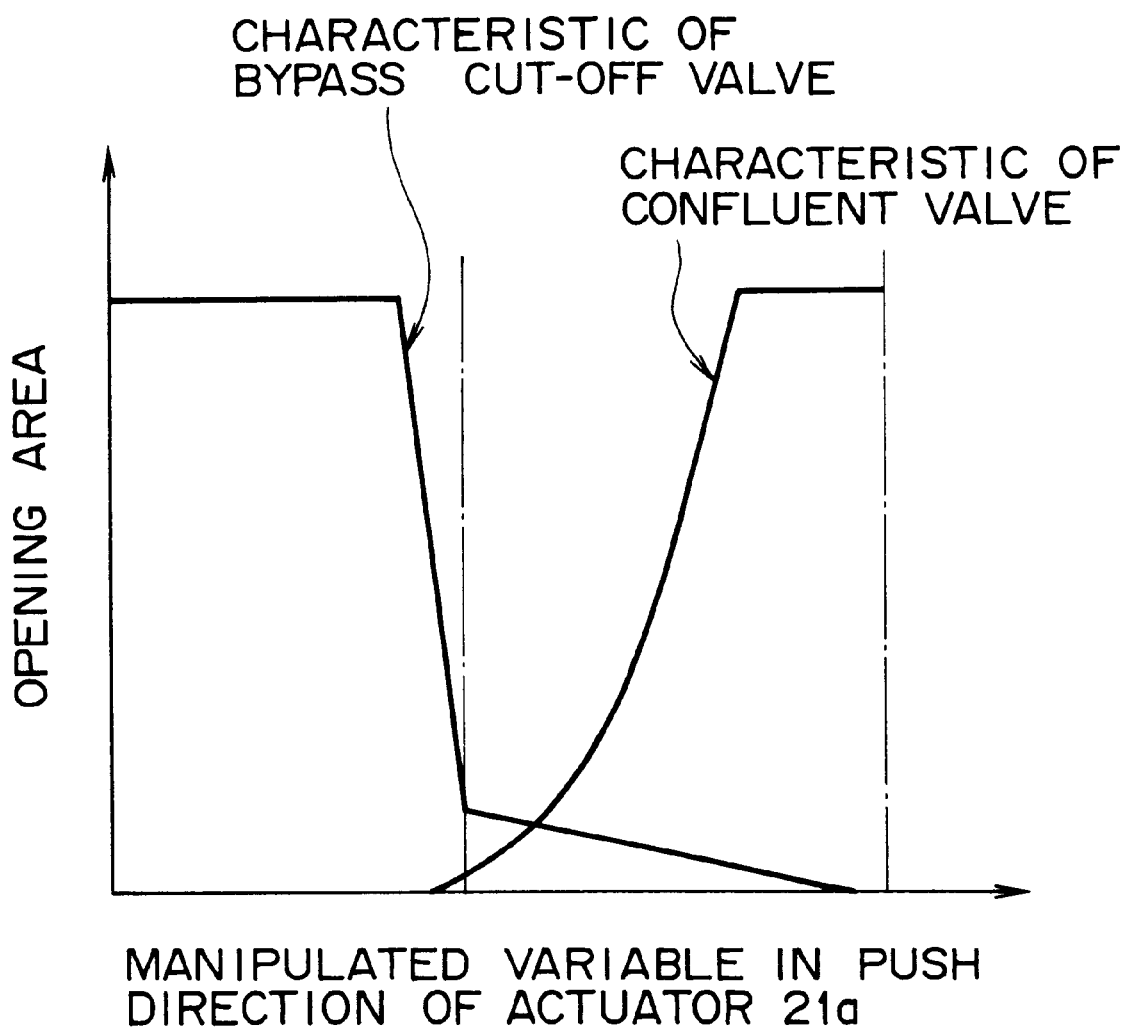
FIG. 7 is a graph to illustrate an opening area characteristic of a confluent valve and a bypass shut-off valve shown in FIG. 6.

In the hydraulic circuit illustrated in FIG. 6, since the pilot pressure signal P21a by the directional operation of the actuator 21a is branched and introduced into the confluent valve 32 and the bypass cut-off valve 33, the opening area characteristics of the confluent valve 32 and the bypass cut-off valve 33 also vary in accordance with the pilot pressure signal P21a. FIG. 7 illustrates the opening area characteristics of the confluent valve 32 and the bypass cut-off valve 33.

Figure 8:
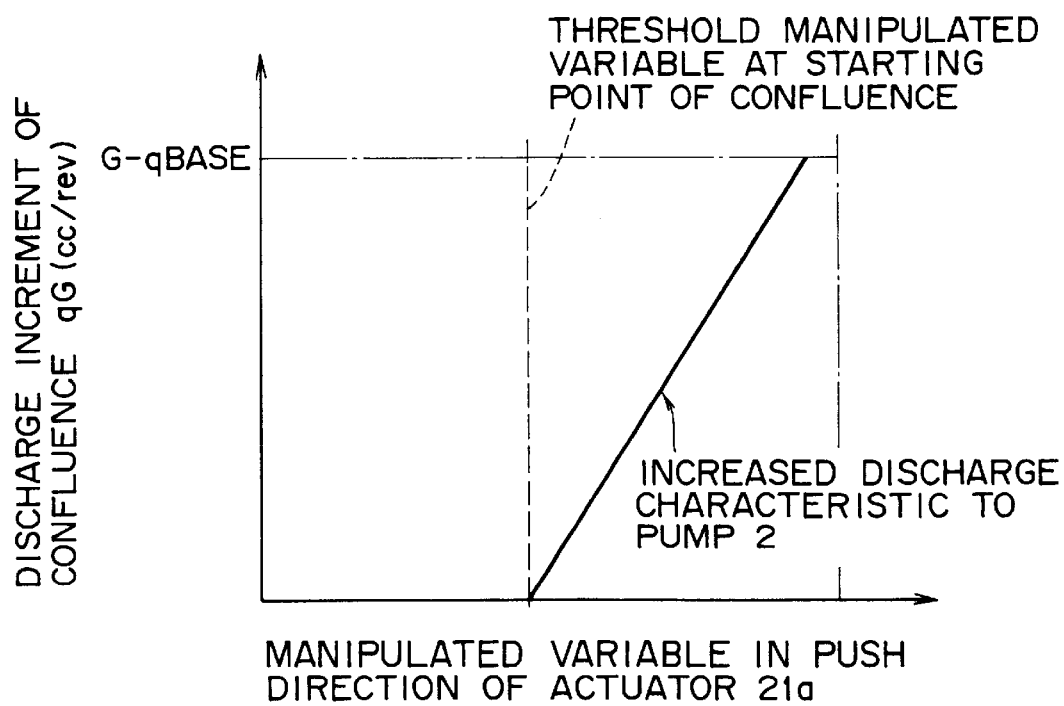
FIG. 8 is a graph to illustrate a discharge increment control while the actuator is in operation.

In FIG. 6, since the confluent circuit to the actuator 21a requires a confluence from near the opening start point of the confluent valve, the discharge increment of a confluence covering from the increment "zero" to a value (G−qBASE), as shown in FIG. 8, in which the basic maximum discharge qBASE is subtracted from the maximum required pump discharge G, is set as a control range to the control valve 21 for the actuator 21a. In detail, when the actuator does not receive a confluent flow, the basic discharge characteristic is set; and when the actuator receives a confluent flow, the extra increment discharge characteristic is set which is made by continuously increasing the maximum discharge point from a specific point (corresponding to the point b in FIG. 2) on the basic discharge characteristic, and the pump discharge corresponding to the control pressure (by the negative control restrictor 28) is acquired using the pump discharge characteristic thus set.

Figure 9:
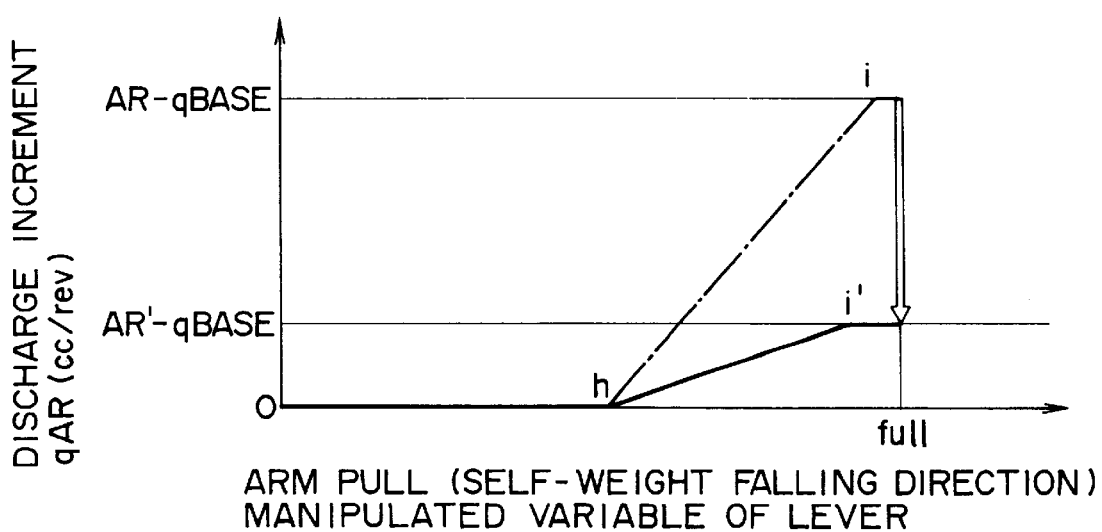
FIG. 9 is a graph to illustrate a pump control characteristic relating to the third invention.
Figure 10:
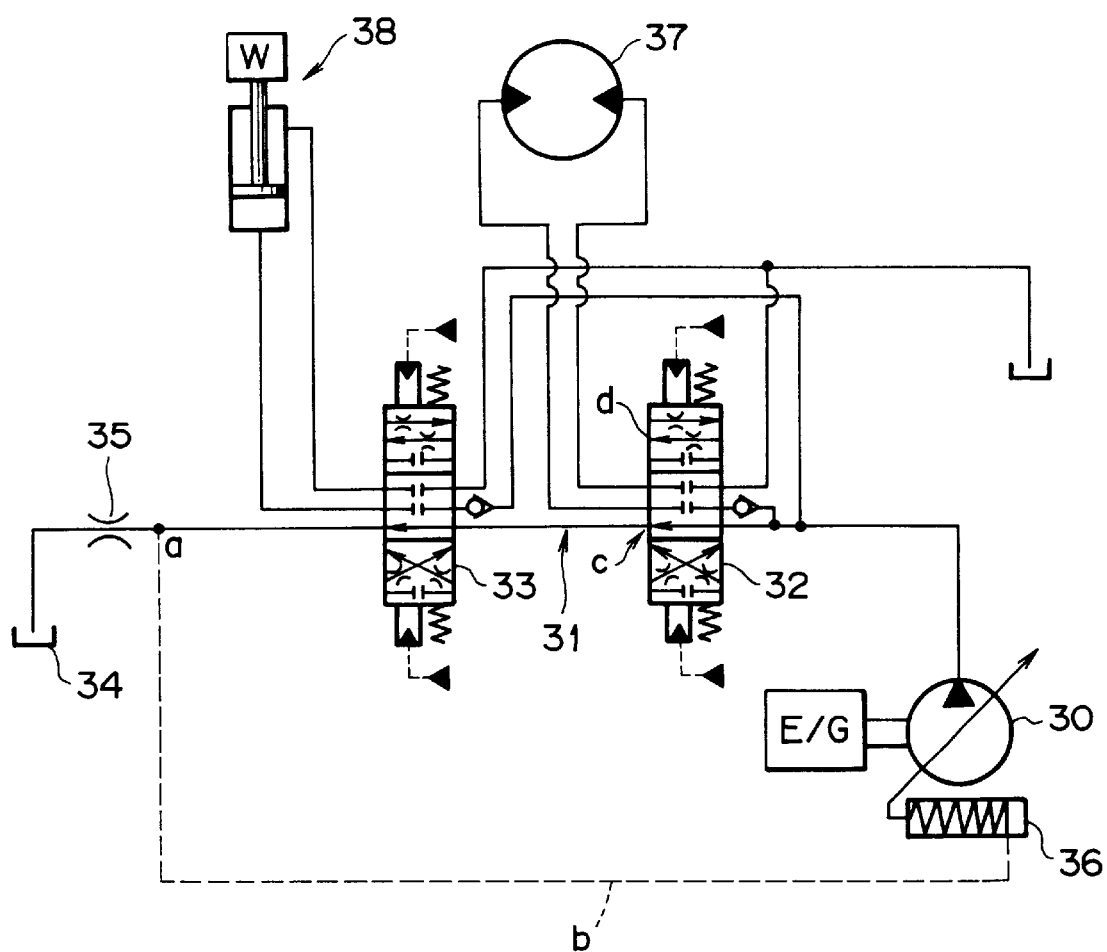
FIG. 10 is a hydraulic circuit to illustrate a conventional negative control.
Figure 11:
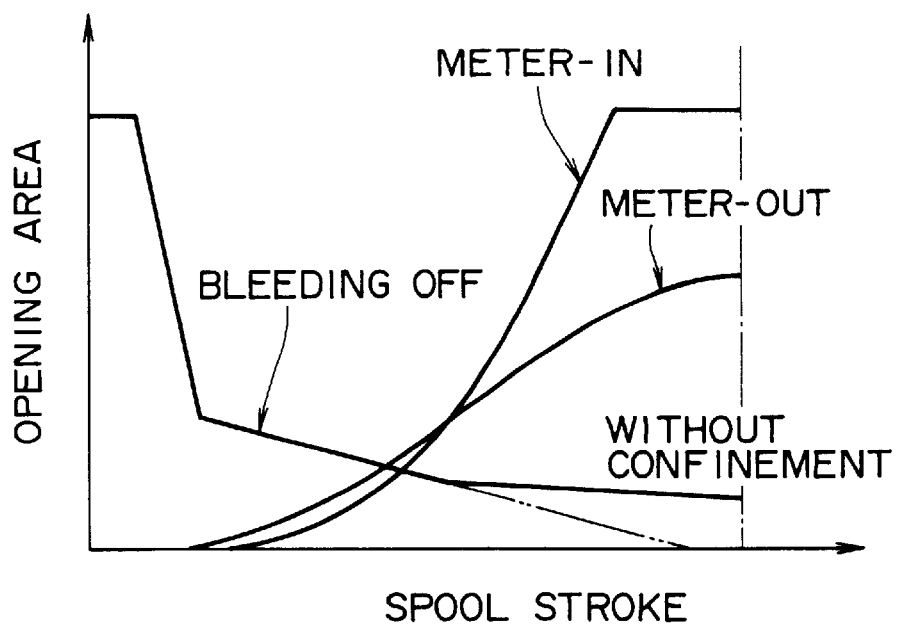
FIG. 11 is a graph to illustrate an opening area characteristic of a conventional valve.
Figure 12:
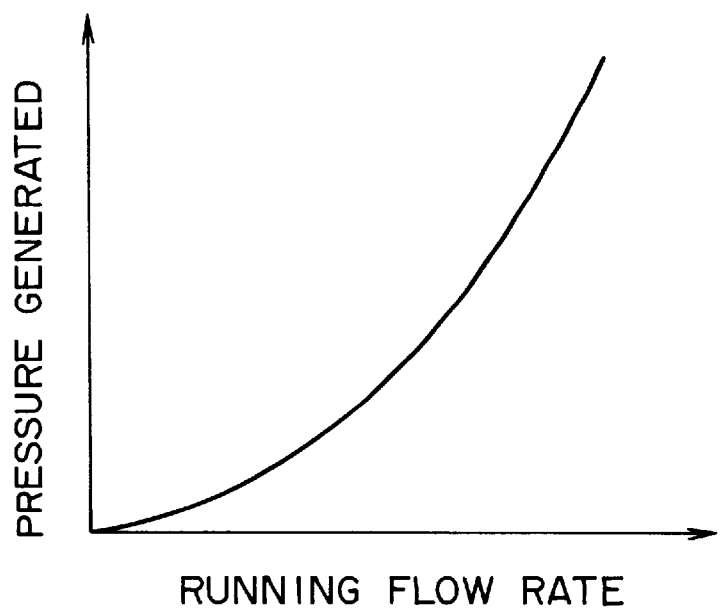
FIG. 12 is a characteristic chart of a pressure generated by a conventional negative control restrictor.
Figure 13:
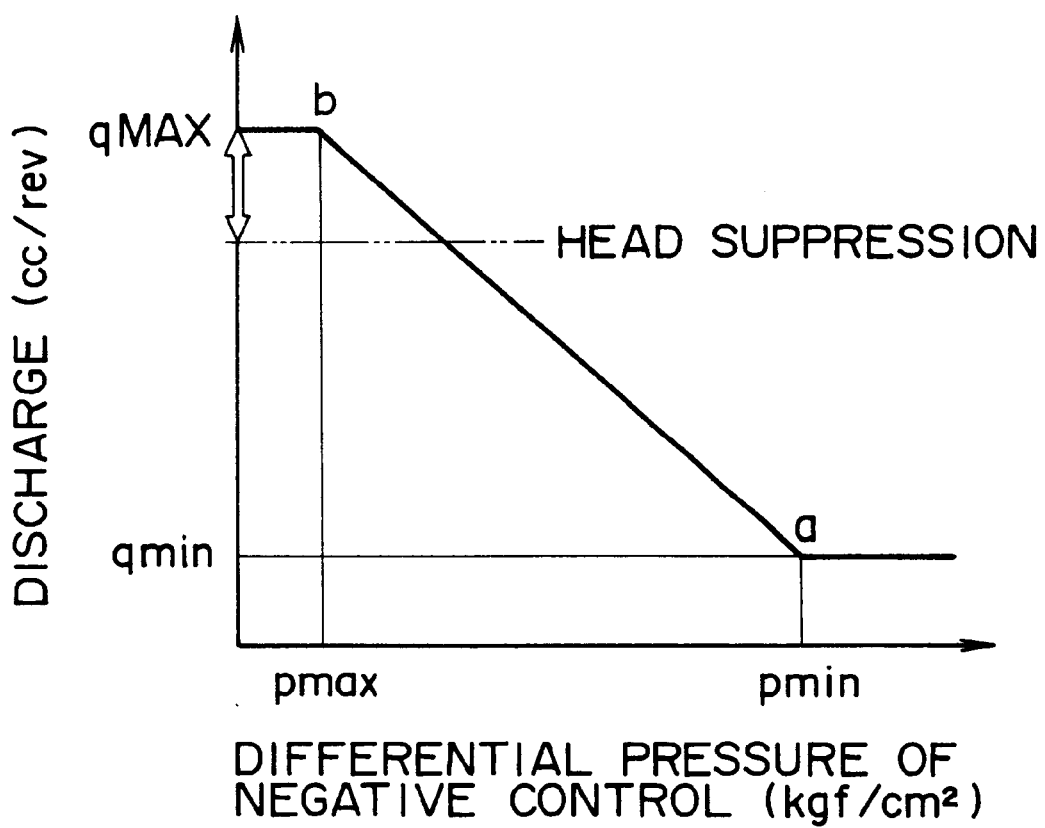
FIG. 13 is a graph to illustrate a conventional pump control characteristic.

Next, a pump control will be described, in case an optional equipment such as a shredder is mounted as a front attachment. In this type of optional equipment, the load imposed onto the control valve is increased in comparison to the normal mode, namely, the case where the normal attachment is mounted. Therefore, as shown in FIG. 9, a lower value i' compared to the discharge increment i in the normal mode is set, with regard to the discharge increment qAR (AR−qBASE).

That is, an operator switches the operation mode into the use of the shredder using an option mode switch (second recognition means), and by this selection the controller (pump characteristic setting means, pump discharge operation means, variable discharge means) recognizes that the optional equipment is installed, and decreases, for example, the maximum pump discharge flow rate in the arm pull operation.

Thereby, in the arm pull operation corresponding to the free fall drop by the self-weight, the arm pull speed can be suppressed. As a result, it becomes possible to prevent an impact by the piston of the hydraulic cylinder colliding against the stroke end from destroying the hydraulic cylinder or the peripheral equipment, or from shortening its life. Therefore, in a work with heavyweight options such as a shredder or breaker mounted on the front end of the front attachment, a stable operation becomes possible, which lightens the burden on the operator.

Further in this invention, the means to generate a control pressure for the negative control is not limited to the fixed restrictor in the foregoing embodiment; and the means can adopt an arbitrary one as, for example, an unload valve, as long as it generates a control pressure.

In the foregoing embodiment, the remote control pressure on the pilot line is detected as a means to recognize the operation; however, it is not limited to this. For example, it may be designed to mount a potentiometer on the operation lever and recognize the operation by detecting a signal from this potentiometer.

As clearly understood from the above description, according to the first invention, the maximum pump discharge to a specific actuator can be varied without altering the negative control.

Further, according to the first invention, it has an advantage that the maximum speed of a specific actuator can be set arbitrarily to achieve a smooth operation. And, in correspondence with the manipulated variable and operational direction of an actuator, the maximum speed of the specific actuator can be controlled.

According to the second invention, when a plurality of pumps are controlled individually, the pump discharge can be controlled in accordance with the manipulated variable, with regard to the confluence to the actuator.

According to the third invention, when a heavyweight optional equipment is mounted in replacement of a normal front attachment, the maximum speed of the control drive for driving the optional equipment can be controled, and the impact at the stroke end can be prevented.

What is claimed is:

1. A pump controller for a construction machine, said construction machine including a variable displacement hydraulic pump, a plurality of control valves connected in series to a center bypass attached to said variable displacement hydraulic pump, and a plurality of actuators to receive and drive a pressure oil whose flow rate and direction are controlled by said control valves, said controller comprising:

means for generating a control pressure for negatively controlling a discharge from said variable displacement hydraulic pump, said means for generating a control pressure being installed at a terminal part of a center bypass line extending from a discharge port of said variable displacement hydraulic pump and passing through said center bypass;

recognition means for recognizing an operation of each of said actuators;

a sensor that converts said control pressure into an electric signal and outputs said electric signal;

pump characteristic setting means for storing a pump discharge characteristic for each of said actuators, selecting said pump discharge characteristic corresponding to the recognition of said recognition means and setting said selected pump discharge characteristic;

pump discharge calculation means for obtaining a pump discharge in accordance with said electric signal outputted from said sensor and said pump discharge characteristic set by said pump characteristic setting means; and variable discharge means for converting said pump discharge obtained by said pump discharge calculation means into a pump control signal and outputting said pump control signal to said variable displacement hydraulic pump.

2. The pump controller for a construction machine set forth in claim 1, wherein said recognition means is comprised of a pressure sensor that detects a remote control pressure introduced at a pilot port of said control valve, and detects a manipulated variable and direction of said actuator for each thereof.

3. The pump controller for a construction machine set forth in claim 1, wherein said pump characteristic setting means sets a basic pump discharge characteristic, with regard to the actuator whose maximum speed is desirably suppressed, and sets an extra increment pump discharge characteristic made by continuously increasing a maximum discharge point from a specific point on said basic pump discharge characteristic, with regard to the actuator whose maximum speed is desirably secured.

4. A pump controller for a construction machine, said construction machine including a plurality of variable displacement hydraulic pumps, a plurality of control valves connected in series to center bypasses attached to each of said variable displacement hydraulic pumps and a plurality of actuators to receive and drive a pressure oil whose flow rate and direction are controlled by said control valves, said controller comprising:

means for generating a control pressure for negatively controlling a discharge from said variable displacement hydraulic pump, said means for generating a control pressure being installed at a terminal part of a center bypass line extending from a discharge port of each of said variable displacement hydraulic pumps and passing through said center bypass, wherein, with regard to a specific one of said actuators, pressure oils discharged from a plurality of said variable displacement hydraulic pumps are combined through a confluent valve;

recognition means for recognizing an operation of each of said actuators;

a sensor that converts said control pressure into an electric signal and outputs said electric signal;

pump characteristic setting means for setting a basic pump discharge characteristic, when said specific actuator does not receive a confluent flow, and setting an extra increment pump discharge characteristic made by continuously increasing a maximum discharge point from a specific point on said basic pump discharge characteristic, when said specific actuator receives said confluent flow;

pump discharge calculation means for obtaining a pump discharge in accordance with said electric control signal outputted from said sensor and said pump discharge characteristic set by said pump characteristic setting means; and variable discharge means for converting said pump discharge obtained by said pump discharge calculation means into a pump control signal and outputting said pump control signal to said variable displacement hydraulic pump.

5. A pump controller for a construction machine, said construction machine including a variable displacement hydraulic pump, a plurality of control valves connected in series to a center bypass attached to said variable displacement hydraulic pump and an actuator to receive and drive a pressure oil whose flow rate and direction are controlled by said control valve, said controller comprising:

means for generating a control pressure for negatively controlling a discharge from said variable displacement hydraulic pump, said means for generating a control pressure being installed at a terminal part of a center bypass line extending from a discharge port of said variable displacement hydraulic pump and passing through said center bypass;

recognition means for recognizing an operation of each of said actuators;

a sensor that converts said control pressure into an electric signal and outputs said electric signal;

second recognition means for recognizing that a load mounted on said actuator is replaced by a different load;

pump characteristic setting means for setting a pump discharge characteristic made by continuously increasing or decreasing a maximum discharge from a specific point on a normal pump discharge characteristic to the actuator with said different load mounted thereon, when said load is replaced by said different load;

pump discharge calculation means for obtaining a pump discharge in accordance with said electric control signal outputted from said sensor and said pump discharge characteristic set by pump characteristic setting means; and variable discharge means for converting said pump discharge obtained by said pump discharge calculation means into a pump control signal and outputting said pump control signal to said variable displacement hydraulic pump.

* * * * *